United States Patent
Jeanroy et al.

(10) Patent No.: US 6,474,161 B1
(45) Date of Patent: Nov. 5, 2002

(54) GYROSCOPIC SENSOR AND ROTATION MEASUREMENT APPARATUS CONSTITUTING AN APPLICATION THEREOF

(75) Inventors: Alain Jeanroy, Conflans Sainte Honorine; Pierre Leger, Issy les Moulineaux, both of (FR)

(73) Assignee: SAGEM SA, Paris (FR)

( * ) Notice: Subject to any disclaimer, the term of this patent is extended or adjusted under 35 U.S.C. 154(b) by 0 days.

(21) Appl. No.: 09/720,103
(22) PCT Filed: Apr. 18, 2000
(86) PCT No.: PCT/FR00/01005
§ 371 (c)(1),
(2), (4) Date: Dec. 21, 2000
(87) PCT Pub. No.: WO00/65307
PCT Pub. Date: Nov. 2, 2000

(30) Foreign Application Priority Data

Apr. 23, 1999 (FR) .............................................. 99 05204

(51) Int. Cl.$^7$ ................................................. G01P 9/04
(52) U.S. Cl. ................................................... 73/504.13
(58) Field of Search ........................ 73/504.13, 504.12, 73/504.04, 504.14, 504.15, 504.16, 1.37, 1.38, 1.75, 1.77, 1.78

(56) References Cited

U.S. PATENT DOCUMENTS

| 4,157,041 A | * | 6/1979 | Loper, Jr. et al. ......... 73/504.13 |
| 4,951,508 A | * | 8/1990 | Loper, Jr. et al. ......... 73/504.13 |
| 5,712,427 A | * | 1/1998 | Matthews ................. 73/504.13 |
| 5,892,152 A | * | 4/1999 | Darling et al. ........... 73/504.13 |

FOREIGN PATENT DOCUMENTS

EP 0175508 * 3/1986

* cited by examiner

*Primary Examiner*—Helen Kwok
(74) *Attorney, Agent, or Firm*—Larson & Taylor, PLC

(57) ABSTRACT

The gyroscopic sensor has a bell-shaped resonator which is fixed along its axis on a substrate. It has a circular edge lying in a plane perpendicular to the axis and at a distance from the point where the resonator is fixed. The substrate carries detection and excitation electrodes that co-operate with the resonator. The detection electrodes are sensitive to an axial component of resonator vibration and the energization electrodes cause vibration at resonance by exerting axial forces.

12 Claims, 2 Drawing Sheets

GYROSCOPIC SENSOR AND ROTATION MEASUREMENT APPARATUS CONSTITUTING AN APPLICATION THEREOF

BACKGROUND OF THE INVENTION

The present invention relates in general to gyroscopic sensors having a mechanical element, referred to as a "resonator", capable of vibrating on a mechanical resonance, detectors responsive to elongation imparted by the vibration to the resonator, and transducers for applying forces to the resonator, and more particularly the invention relates to gyroscopic sensors in which the resonator, in the form of a bell or a cap having a rotational symmetry is fixed along its axis and presents a circular edge situated in a plane perpendicular to the axis and at a distance from the fixing point in the axial direction.

Gyroscopic sensors are already known that use such a resonator. Embodiments can be found in U.S. Pat. No. 4,157,041 (General Motors Corporation) and U.S. Pat. No. 4,951,508. In general, the resonator is constituted by a hemispherical cap made of silica enabling very high Q-factors to be obtained, possibly in excess of $5 \times 10^6$. Capacitive-type detectors are placed in such a manner that the vibratory movement of the resonator in the radial direction modifies the inter-electrode distance. Transducers for exciting resonance are placed so as to exert electrostatic forces at least in two particular radial directions in which elongation is detected by variation in the inter-electrode distance.

To obtain sufficient efficiency in detection and energization, the airgaps of the detector and of the transducers must be small. In practice, the fixed electrodes of the transducers and of the detectors are placed on spherical pieces that are concave or convex depending on whether they are outside or inside the resonator, and they are adjusted to define the airgaps. In practice, it is not possible to reduce these gaps to less than 100 $\mu$m to 200 $\mu$m.

Such a sensor is very expensive to make. Obtaining small and identical airgaps between spherical pieces requires very high precision in manufacture and accurate concentricity. It is much more difficult to make electrodes on spherical surfaces than it is on plane surfaces. The tracks of conductors for making electrical connections and any guard electrodes around the electrodes of the detector and the transducer are likewise difficult to make in three dimensions. Finally, it is necessary for the thermal expansion coefficients of the resonator and of the spherical pieces carrying the fixed electrodes to match.

Until now, all of those constraints have limited the use of sensors having a cap-shaped or bell-shaped resonator to top-of-range applications, which can accept such high cost.

SUMMARY OF THE INVENTION

The present invention seeks to provide a gyroscopic sensor of the above-defined kind that can be made at much lower cost than presently-existing sensors.

To achieve this result, the invention makes use of an observation that has previously been overlooked, i.e. that the edge of a bell-shaped or cap-shaped resonator excited in a mode of vibration that gives rise to deformation with both radial and tangential components also presents a component of displacement parallel to the axis of the resonator. In the particular case of a hemispherical resonator, it will be shown that the amplitude of its axial displacement is equal to half the amplitude of its radial displacement.

The invention provides in particular a sensor having:

a resonator in the form of a bell or a circularly-symmetrical cap, the resonator being fixed on its axis and presenting a circular edge situated in a plane perpendicular to the axis and at a distance from the fixing point of the resonator in the axial direction; and a substrate carrying detection and excitation means for co-operating with the resonator;

the sensor being characterized in that the detection and excitation means co-operate with an axial component of resonator vibration.

In an advantageous embodiment, said means comprise detectors and transducers which can be placed on the substrate which is orthogonal to the axis, and placed facing the edge of the resonator.

The detectors and/or transducers can have various known structures. They can have electrodes co-operating with the resonator to constitute capacitive detectors and electrodes co-operating with the resonator that constitute capacitive excitation transducers.

The detection and excitation means can be made using the same components operating in time sharing, or by modulating carriers at different frequencies. Displacements in the presence of an excitation signal can then be detected by synchronous detection. Furthermore, the detectors and/or transducers can be of kinds other than electrostatic.

The bottom of the resonator is advantageously fixed to the substrate by means made of a material having substantially the same coefficient of expansion as the resonator, so as to make the sensor very insensitive to temperature variations.

It can be seen that the sensor of the invention uses the axial component of the displacement of the edge of the resonator to detect the amplitude of the vibration at the measurement points, and also for the purpose of exciting the resonator.

When the resonator is not hemispherical, the amplitude of the axial displacement of the edge is not necessarily equal to half its radial amplitude. In particular, the amplitude of axial deformation at the edge decreases with increasing depth (axial length) of the resonator starting from the hemispherical shape.

In practice, an airgap at rest lying in the range 5 $\mu$m to 100 $\mu$m is adopted, and generally lying in the range 5 $\mu$m to 20 $\mu$m, i.e. values which are much easier to achieve with mutually confronting plane surfaces than with facing spherical surfaces. To retain acceptable dimensions, a resonator will generally be used having a natural frequency of less than 10 kHz. It is desirable for the sensor to be placed in a vacuum in order to reduce damping.

The resonator can be of constant wall thickness. It can also have greater thickness in the portion close to the edge so as to increase the effective area of the electrodes carried by the substrate. The electrodes placed on the substrate will advantageously present a radial dimension greater than that of the edge of the resonator so as to project beyond both sides thereof and so that a small amount of off-centering will have no effect on measurement.

BRIEF DESCRIPTION OF THE DRAWINGS

The above characteristics, and others, will appear better on reading the following description of particular embodiments, given as non-limiting examples. The description refers to the accompanying drawings, in which.

DETAILED DESCRIPTION OF THE DRAWINGS

Before describing the hardware structure of the gyroscopic sensor, it is appropriate to show that the deformation of a resonator in the form of a cap or a bell is complex, and cannot be regarded as constituting purely radial and tangential oscillation of the edge.

Figure 1:
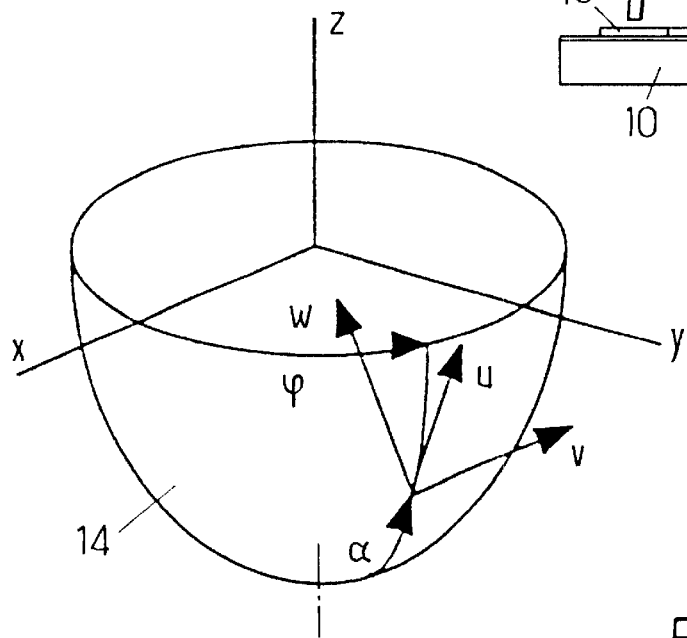
FIG. 1 is a schematic view of a hemispherical resonator and it shows the parameters involved in vibration.

In spherical coordinates, and using the notation specified in FIG. 1, the analytical equations for the n=2 mode (i.e. the basic mode) are as follows:

$$u = \sin \alpha \cdot \tan^2(\tfrac{1}{2}\alpha) \cdot \sin 2(\phi-\phi_0) \cdot \cos \omega(t-t_0) + B \cdot \sin \alpha \cdot \tan^2(\tfrac{1}{2}\alpha) \cdot \sin 2(\phi-\phi_0) \cdot \cos \omega(t-t_0)$$

$$v = A \cdot \sin \alpha \cdot \tan^2(\tfrac{1}{2}\alpha) \cdot \sin 2(\phi-\phi_0) \cdot \sin \omega(t-t_0) - B \cdot \sin \alpha \cdot \tan^2(\tfrac{1}{2}\alpha) \cdot \cos 2(\phi-\phi_0) \cdot \cos \omega(t-t_0)$$

$$w = A \cdot (2+\cos \alpha) \cdot \tan^2(\tfrac{1}{2}\alpha) \cdot \cos 2(\phi-\phi_0) \cdot \sin \omega(t-t_0) + B \cdot (2+\cos \alpha) \cdot \tan^2(\tfrac{1}{2}\alpha) \cdot \sin 2(\phi-\phi_0) \cdot \cos \omega(t-t_0)$$

At the equator, $\alpha = 90°$, and the equations become:

$$u = A \cdot \cos 2(\phi-\phi_0) \cdot \sin \omega(t-t_0) + B \cdot \sin 2(\phi-\phi_0) \cdot \cos \omega(t-t_0)$$

$$v = A \cdot \sin 2(\phi-\phi_0) \cdot \sin \omega(t-t_0) - B \cdot \cos 2(\phi-\phi_0) \cdot \cos \omega(t-t_0)$$

$$w = A \cdot 2 \cdot \cos 2(\phi-\phi_0) \cdot \sin \omega(t-t_0) + B \cdot \sin 2(\phi-\phi_0) \cdot \cos \omega(t-t_0)$$

In these equations, u, v, and w designate the amplitudes of axial displacement, of tangential displacement, and of radial displacement. $\phi$ designates azimuth angle.

Figure 2:
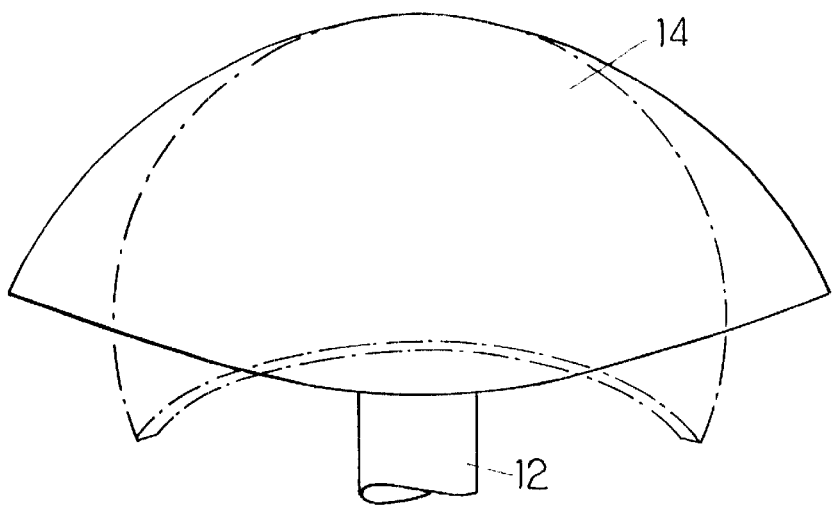
FIG. 2 shows the extreme shapes taken during second-order vibration of a resonator of the kind shown in FIG. 1, the deformation being greatly exaggerated for greater clarity.
Figure 2A:
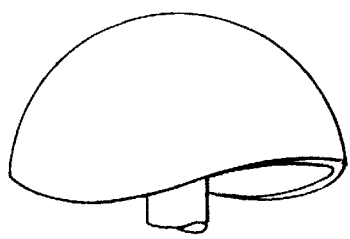
FIG. 2A is a view on a plane at 45° to that of FIG. 2 showing an extreme shape that the resonator can take up.

FIG. 2 shows in continuous lines and in chain-dotted lines the successive shapes taken by the resonator when in vibration, and it shows that axial elongation arises that is equal to half the radial elongation.

Until now, the radial displacement w has been used. In contrast, the invention proposes using the axial displacement u. For a hemispherical resonator, the amplitude of this displacement is equal to half the amplitude of the radial displacement w, and at first sight that would appear to be a drawback.

However, in reality, this reduction in the amplitude to be measured is more than compensated by characteristics that are very favorable. Because the airgap (inter-electrode distance) is plane, it can be defined accurately while the resonator is being assembled onto the substrate, e.g. using pieces of shim. The size of the airgap can be reduced without difficulty down to a value of 10 μm to 20 μm, which is one-tenth that which can be used with the conventional architecture. To a first approximation, the efficiency of transducers and detectors is proportional to the surface area of the electrodes divided by the square of the airgap. This shows the advantage of the solution proposed, since it enables the airgap to be reduced very considerably. Since the value of the airgap is involved as a squared term, reducing the airgap also makes it possible to more than compensate for the smaller active area of the electrodes.

Figure 3:
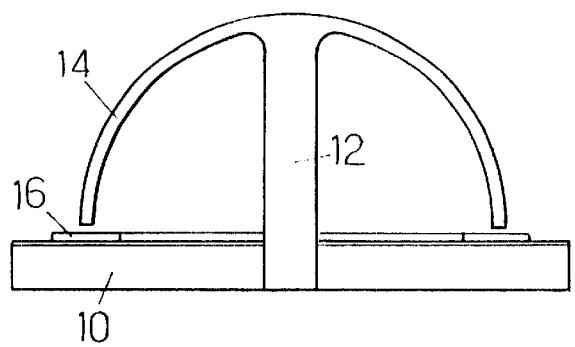
FIG. 3 shows one possible way of mounting a resonator on a substrate.

The sensor shown in FIG. 3 comprises a substrate on which the resonator 14 is fixed by a stalk or rod 12. In order to ensure that the size of the airgap varies little with temperature, it is preferable for the supporting stalk 12 to be made of the same material as the resonator or of a material that has a similar coefficient of thermal expansion.

The resonator can be made of silica, thus making it possible to obtain high Q-factors, and it can have a conductive metal coating. The metal coating can be restricted to a ring covering the edge of the resonator and to metal tracks for establishing a reference potential, which can be a constant potential (generally ground) or an adjustable potential. It is often possible merely by chemical surface treatment of the silica to obtain a level of quality for the spherical surface that is sufficient to obtain a high Q-factor, thus avoiding the need to include a polishing step as is necessary in the conventional disposition.

However, given that the efficiency of the excitation transducers is greater than in conventional setups, it is also possible to use a metal resonator which is less expensive to make. When the stalk 12 is made out of the same material as the resonator, it can be integral therewith and received in the substrate 10.

The substrate can be constituted by a piece of metal coated with an insulating film on which the fixed electrodes of the transducers and of the detectors are arranged, with the thickness thereof being represented diagrammatically at 16 in FIG. 3.

Various electrode layouts are possible. In general, at least two electrodes (or two pairs of opposite electrodes) are placed in mutually orthogonal orientations in a frame of reference for the selected mode, i.e. at 45° to each other for second-order mode. Similarly, the transducers for applying forces will be located on two directions that are mutually orthogonal in the same frame of reference.

Figure 4:
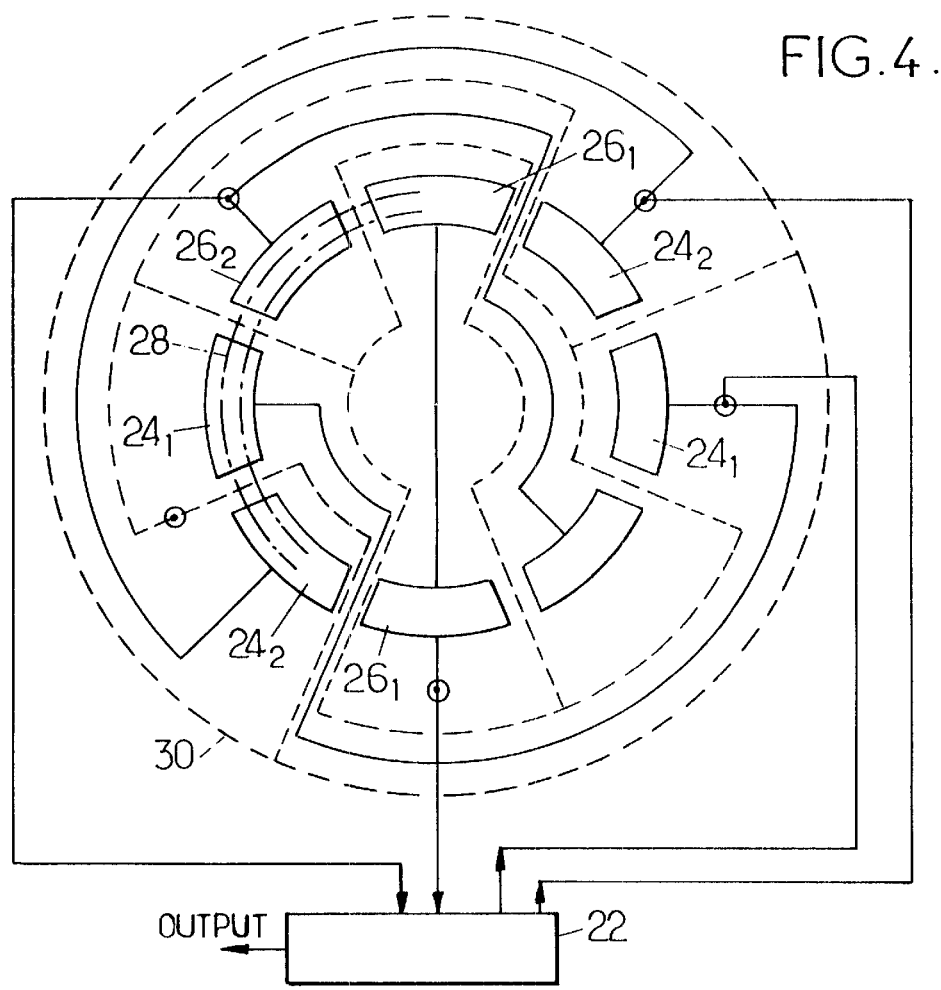
FIG. 4 is a view from above showing one possible disposition of electrodes, transducers, and detectors on the substrate.

In the embodiment of FIG. 4, the electrostatic transducers are defined by two pairs of electrodes $24_1$ and $24_2$ in alignment on two directions that are at 45° to each other, thus enabling second-order vibration to be sustained. The detectors are defined by two pairs of electrodes $26_1$ and $26_2$ likewise disposed on two directions at 45° from each other. The output signals taken from the electrodes $26_1$ and $26_2$ are applied to an electronic calculating and power circuit 22 which energizes the transducers to sustain vibration of constant amplitude and which supplies an output signal which, depending on circumstances, is representative of an angle of rotation or of a speed.

In order to be able to accommodate errors in centering of the resonator relative to the substrate, and in order to avoid any influence of the radial component of vibration on the output signal, the electrodes 24 and 26 are larger in the radial direction than the thickness of the edge of the resonator 14, outlined at 28 in FIG. 4.

It can be seen that all the internal connections to the sensors can be made in a single layer. It can also be seen that it is possible to place guard electrodes 30 using the scheme represented by dashed lines so as to reduce coupling.

The electronic circuit 22 for measurement and control can have a wide variety of structures. In particular it can have the structure described in document EP-A-0 810 418 so as to constitute a rate gyro. It is also possible to use one of the circuit structures described in document EP 0 578 519 that make it possible to obtain rate gyro operation (measuring speed of rotation) or gyroscope operation (measuring angle of rotation).

Still for operating in n=2 mode, the sensor can be provided with sixteen electrodes instead of eight. It is also possible to make the sensor of the invention operate in a mode that is greater than 2 by increasing the number of electrodes, although as a general rule such a modification presents little advantage.

In general, the mechanical characteristics of the resonator should be selected so that it has a natural frequency lying in the range 3 kHz to 10 kHz, since performance drops off above the higher value. A hemispherical resonator having a diameter lying in the range 10 mm to 50 mm has given good results. The amplitude of the vibration can be regulated so as to lie in a range of from 0.5 μm to 1 μm. The resonator can be grounded via its support 12. However, in other circumstances, it can be preferable to take the resonator to a different voltage, which can be fixed or modulated. The resonator is contained in a housing (not shown) in which pressure is low, and in practice less than $10^{-3}$ millibars, so as to reduce gas damping.

As mentioned above, the resonator can be of a shape other than hemispherical. In particular, the cross-section of the resonator in a plane containing its axis can be in the form of an arc of a parabola or an arc of an ellipse.

Figure 5:
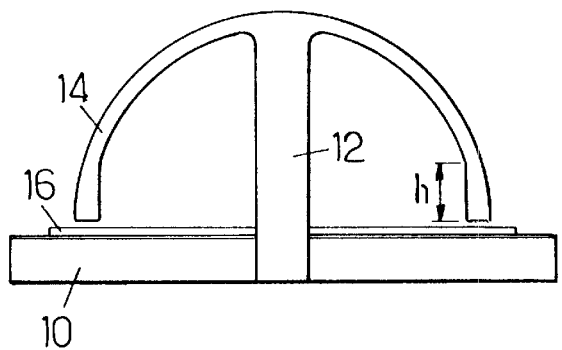
FIGS. 5 and 6 are diagrams showing modified embodiments of the resonator.
Figure 6:
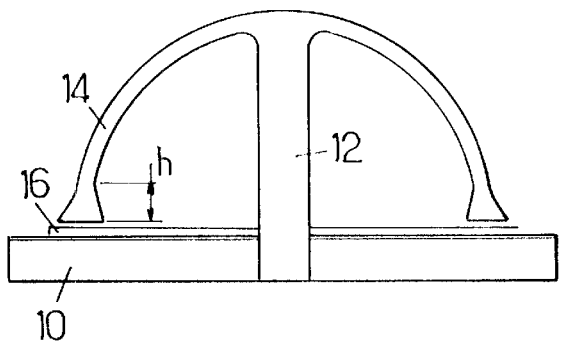

In order to increase the surface area of the individual capacitors formed by the transducers and the detectors, it is possible for the resonator to be enlarged in the vicinity of its edge. FIG. 5 shows a resonator where this result is achieved by giving the inside surface of the resonator a cylindrical shape, over a height h that is small as compared with the total depth of the resonator. In the case shown in FIG. 6, this result is achieved by giving the inside surface and the outside surface a shape that flares away from a spherical surface in a zone h that is likewise small relative to the depth of the resonator.

Figure 7:
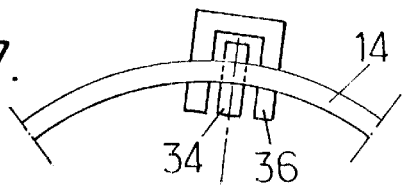
FIG. 7 is a diagrammatic plan view of a set of capacitor electrodes suitable for use as a detector instead of the electrodes shown in FIG. 4.

As mentioned above, the transducers and/or detectors can be of a structure that is different from that shown in FIG. 4. By way of example, FIG. 7 shows a sensor constituted by two electrodes placed on the substrate 10. The central electrode 34 is in the form of a radial strip. The other electrode 36 is U-shaped with its legs disposed on either side of the central electrode 34. This makes it easier to make the resonator since there is no need for it to be coated with a conductive layer. The capacitance of the capacitor constituted by the electrodes 34 and 36 varies during axial vibration because the dielectric constant of the material constituting the resonator (e.g. silica) is different from that of the generally very low pressure atmosphere between the edge of the resonator and the electrodes.

As in the case shown in FIG. 4, the electrodes 34 and 36 need to be of a radial extent that is sufficient to ensure that if the resonator is slightly off-center that has no effect on measurement in spite of the radial components in the vibration of the resonator.

What is claimed is:

1. A gyroscopic sensor comprising:
    a bell or cap-shaped resonator having a rotational symmetry;
    means for fixing said resonator to a substrate along an axis thereof, said resonator having a circular edge situated in a plane perpendicular to the axis and at a distance from a point where said resonator is fixed;
    excitation means carried by said substrate and co-operating with the resonator for causing said resonator to vibrate in a given resonance mode; and
    electrical detection means and carried by said substrate and co-operating with the resonator for detecting axial movements of said edge caused by vibration of said resonator.

2. A sensor according to claim 1, wherein: said substrate has a surface which is planar, is orthogonal to the axis and confronts said edge which is electrically conductive; said electrical detection means comprise detection electrodes carried by said substrate and facing said edge; and said excitation means comprise transducers having electrodes also facing said edge.

3. A sensor according to claim 1, wherein the detection means comprise detection electrodes co-operating with the edge to constitute capacitive detectors and the excitation means comprise drive electrodes co-operating with the edge to constitute capacitive energization transducers.

4. A sensor according to claim 3, wherein an axial distance at rest between:
    the detection electrodes and the drive electrodes and the edge lie in the range 5 μm to 100 μm.

5. A sensor according to claim 3, wherein the detection electrodes and the drive electrodes carried by said substrate extend radially beyond either side of the edge of the resonator in rest condition.

6. A sensor according to claim 3, wherein, for vibration of the resonator in second-order mode, the substrate has at least two sets of detection electrodes mutually aligned in each set, the two sets being along two directions at 45° from each other, and two sets of drive electrodes in alignment on two directions at 45° from each other.

7. A sensor according to claim 2, wherein the resonator is made of metal or of metal-plated silica.

8. A sensor according to claim 1, wherein the means for fixing the resonator comprise a rod made of a material having substantially a same coefficient of thermal expansion as the resonator and is located between said point and said substrate inside said resonator.

9. A sensor according to claim 1, wherein the resonator is maintained at a predetermined voltage, which is fixed or modulated, through said fixing means.

10. A gyroscopic sensor having:
    a bell or cap-shaped mechanical resonator having a rotational symmetry and apt to radially vibrate at a resonance frequency;
    securing means for fixing said resonator to a substrate along an axis thereof and arranged so that a circular edge of said resonator be situated in a plane which at rest is perpendicular to said axis and at an axial distance from a point where said resonator is connected to said securing means whereby resonance of said resonator causes axial and radial movement of said edge with respect to said substrate;
    electrical detection electrodes carried by said substrate along at least two different radial directions and extending radially beyond either side of the edge of the resonator in rest condition, co-operating with the resonator for detecting axial movements of said edge caused by vibration of said resonator and connected to means for determining a direction of vibration of the resonator from signals delivered by said detection electrodes; and
    energization transducers having electrodes also facing said edge and connected to means for causing vibration of said resonator at said resonance frequency.

11. Rotation-measuring apparatus comprising:
    (a) a gyroscopic sensor having:

a bell or cap-shaped resonator having a rotational symmetry;

securing means for fixing said resonator to a substrate along an axis thereof and arranged so that a circular edge of said resonator be situated in a plane perpendicular to said axis and at an axial distance from a point where said resonator is fixed by said securing means;

electrical detection electrodes and energization electrodes carried by said substrate and co-operating with the resonator for detecting axial movements of said edge caused by vibration of said resonator and for causing said vibration, respectively; and (b) an electronic circuit for receiving output signals supplied by the detection electrodes and for energizing the energization electrodes to sustain vibration by creating forces at a resonant frequency of the resonator, and for calculating a rotation of the resonator about said axis by processing said output signals.

12. A gyroscopic sensor according to claim 10, wherein said substrate has at least two sets of detection electrodes mutually aligned in each set, the two sets being along two directions at 45° from each other and two sets of drive electrodes in alignment on two directions at 45° from each other.

* * * * *